United States Patent

Boudy et al.

[11] Patent Number: 5,848,151
[45] Date of Patent: Dec. 8, 1998

[54] ACOUSTICAL ECHO CANCELLER HAVING AN ADAPTIVE FILTER WITH PASSAGE INTO THE FREQUENCY DOMAIN

[75] Inventors: Jérome Boudy, Fontenay le Fleury; François Capman, Versailles, both of France

[73] Assignee: Matra Communications, France

[21] Appl. No.: 714,107

[22] PCT Filed: Jan. 22, 1996

[86] PCT No.: PCT/FR96/00100

§ 371 Date: Nov. 13, 1996

§ 102(e) Date: Nov. 13, 1996

[87] PCT Pub. No.: WO96/23384

PCT Pub. Date: Aug. 1, 1996

[30] Foreign Application Priority Data

Jan. 24, 1995 [FR] France .................................. 95 00777

[51] Int. Cl.⁶ .................................................. H04M 9/00
[52] U.S. Cl. .......................... 379/410; 379/406; 379/411; 381/71.1
[58] Field of Search ..................................... 379/410, 411, 379/406, 409, 407; 395/2.31, 2.35, 2.42; 364/724.19, 724.1; 381/71.1

[56] References Cited

U.S. PATENT DOCUMENTS

| 4,897,878 | 1/1990 | Boll et al. | 395/2.42 |
| 5,148,489 | 9/1992 | Erell et al. | 395/2.35 |
| 5,274,739 | 12/1993 | Woodard | 395/2.42 |
| 5,295,224 | 3/1994 | Makamura et al. | 395/2.32 |
| 5,351,291 | 9/1994 | Menez et al. | 379/410 |
| 5,475,731 | 12/1995 | Rasmusson | 379/410 |
| 5,483,594 | 1/1996 | Prado et al. | 379/410 |
| 5,526,426 | 6/1996 | McLaughlin | 379/410 |
| 5,636,323 | 6/1997 | Umemoto et al. | 379/410 |
| 5,638,439 | 6/1997 | Kawada et al. | 379/410 |
| 5,657,384 | 8/1997 | Staudacher et al. | 379/388 |
| 5,680,393 | 10/1997 | Bourmeyster et al. | 379/410 |

Primary Examiner—Daniel S. Hunter
Assistant Examiner—Jacques Saint-Surin
Attorney, Agent, or Firm—Evenson, McKeown, Edwards & Lenahan, P.L.L.C.

[57] ABSTRACT

The echo canceller comprises an adaptive filter receiving the coefficients of a direct discrete transform into the frequency domain, computed on successive blocks of an input signal and fed via an inverse transform circuit to the subtractive input of an adder for forming an output signal going to the network, and an adaptor circuit for adapting the coefficients of the filter. The adaptor circuit receives the coefficients of successive transforms of blocks of output signal samples via a noise reducer.

7 Claims, 2 Drawing Sheets

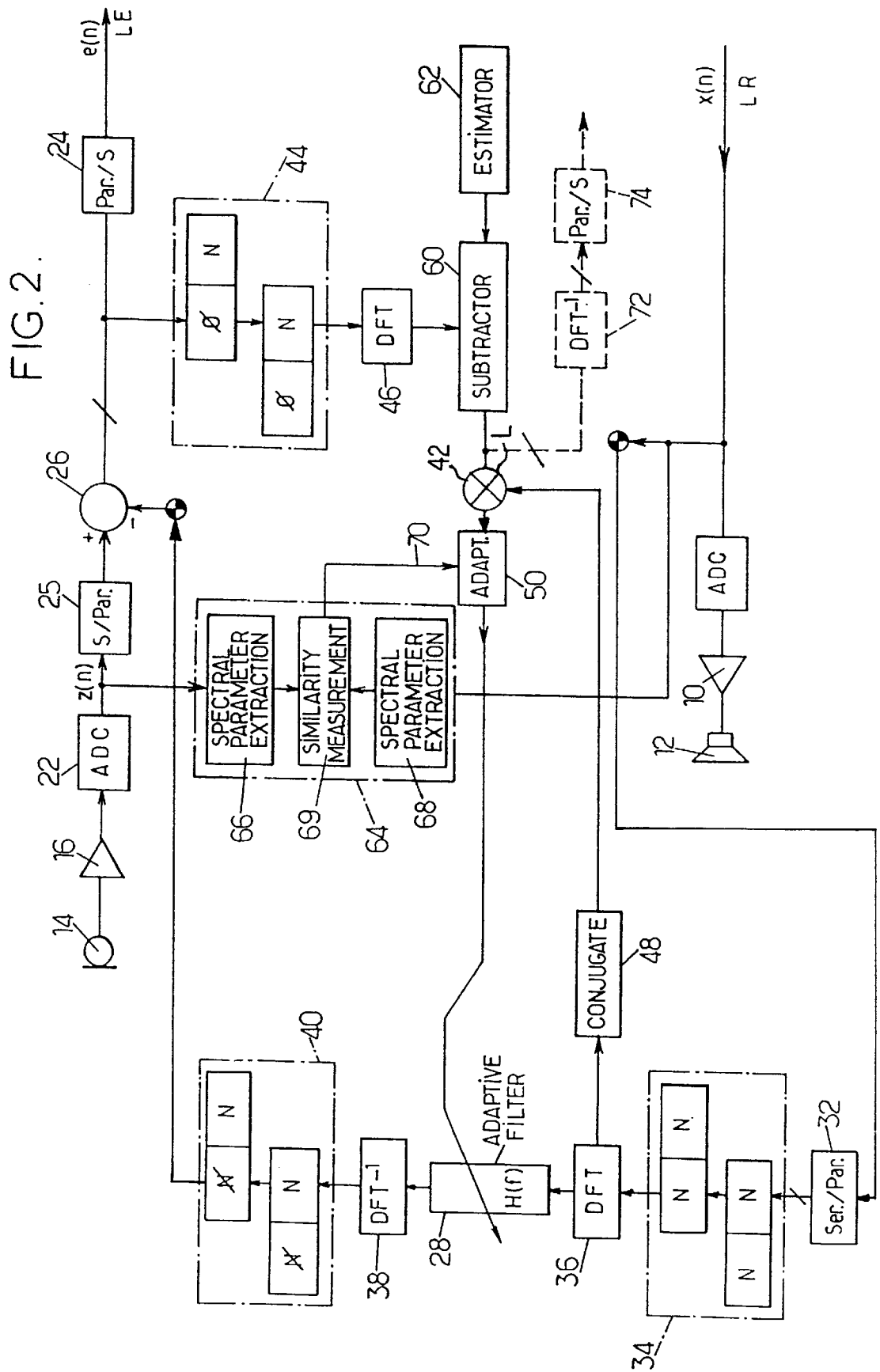

ACOUSTICAL ECHO CANCELLER HAVING AN ADAPTIVE FILTER WITH PASSAGE INTO THE FREQUENCY DOMAIN

BACKGROUND OF THE INVENTION

The present invention relates to acoustical echo cancellers for telephone terminals used under conditions in which the signal output to a telephone line is affected by an acoustical echo, often together with noise due to the surroundings. A major application lies in installations that may include portable hands-free terminals and in teleconferencing installations.

Adaptive transversal filters operating in the time domain are often used in acoustical echo cancellers. Implementation thereof encounters numerous difficulties. The number of coefficients required for modelling the impulse response of an acoustical echo path is very high. Speech signals have a high degree of self-correlation and they are non-stationary.

Finally, the signal received by the input sensor (usually a microphone) includes not only the acoustical echo, but also room noise and near-end speaker speech, in the case of simultaneous speech.

To take account of the length of the impulse response and the high degree of correlation, proposals have already been made to use filters implementing an algorithm that operates in the frequency domain. However, problems remain with resistance to room noise and with taking account of the situation when both the near-end speaker and the far-end speaker are speaking simultaneously.

Attempts have been made to improve the characteristics of adaptive transversal filters operating in the time domain or in the frequency domain. In the time domain, proposals have been made in particular to apply the stochastic gradient algorithm (also known as the least mean square (LMS) algorithm) to blocks of samples rather than sample by sample. The gradient is then estimated block by block and provides an indication concerning the correlation between the input signal and the error signal on the corresponding block. Adaptive echo cancellers have also been proposed operating in the frequency domain, based on fast convolution techniques of the overlap-and-save (OLS) type or of the overlap-and-add (OLA) type. FIG. 1 is a block diagram of an adaptive filter usable in an echo canceller of this kind. The incoming digital signal x(n), where n is the order of the sample, is applied to a loudspeaker 12 after analog-to-digital conversion ADC and amplification by an amplifier 10. The acoustical echo arrives via a path 13 to the detector 14 which is generally constituted by a microphone. The microphone also receives room noise and, at certain moments, a speech signal from the near speaker. The signal amplified at 16 is put into digital form z(n) by an analog-to-digital converter 22.

The near terminal echo canceller is interposed between the receive line LR receiving the incoming signal and the send line LE supplying the outgoing signal. Because the filter operates on blocks, it includes in the send line LE an input serial-to-parallel converter 23 and an output parallel-to-serial converter 24, with an adder 26 being interposed therebetween which receives the input sample blocks on an additive input, and on a subtractive input receives the correction signal blocks as generated by an adaptive filter 28.

The echo canceller shown in FIG. 1 operates in the frequency domain and it uses a partition-and-overlap procedure. This amounts to computing a Fourier transform (or more generally a transform going from the time domain to the frequency domain), of a size equal to twice the length of the estimated impulse response N. The filter 28 receives the incoming signal x(n) via a serial-to-parallel converter 32 enabling blocks to be built up, a circuit 34 for partitioning into blocks with overlap, and a circuit 36 for computing the discrete Fourier transform (DFT). Symmetrically, the output from the filter 28 is applied to a circuit 38 for computing the inverse Fourier transform (DFT$^{-1}$), and thence via an overlap circuit 40 for recovering the last block, to the adder 26.

The means for adapting the coefficients of the frequency filter 28 are of known general structure. They comprise a multiplier 42 which receives the output samples from the adder 26 via partition means 44 and a DFT computing circuit 46 and receives the conjugate 48 of the DFT generated by the circuit 36. The output from the multiplier 42 is applied to the circuit 50 for adapting the coefficients of the filter 28; this circuit can use one of the usual algorithms, such as the frequency stochastic gradient algorithm (or frequency least mean square (FLMS) algorithm).

In the embodiment shown in FIG. 1, an additional constraint on the gradient is provided by a circuit 52. This circuit includes an inverse DFT 54 and a direct DFT 56 that are required for forcing the last end samples of the impulse response to zero, the transforms being computed on 2N, i.e. on twice the length of the estimated impulse response. The gradient constraint can be stored in the form of a constraint matrix in a circuit 58 interposed between the inverse and direct transforms.

Instead of a Fourier transform, it is possible to use some other transform into the frequency domain, for example the cosine transform or the fast Hartley transform. Various embodiments of acoustical filters having the general structure shown in FIG. 1 have already been described. Reference may be made, for example, to the article by Borrallo et al. entitled "On the implementation of partitioned-block frequency domain adaptive filter (PBFDAF) for long acoustic echo cancellation", Signal Processing, Vol. 27, No. 3, pages 301–315, June 1992.

When the impulse response is short, which applies in particular for a hands-free telephone for use in a vehicle, a block overlap technique can be used without block partitioning being necessary to reduce complexity. It implements, for example, a (constrained) FLMSO algorithm or an (unconstrained) UFLMSO algorithm.

It is difficult to give frequency echo cancellers of the kind described above sufficient resistance to noise. The usual algorithms are also very sensitive to the value of the incrementation step size. At small signal-to-noise ratios, it is necessary to reduce this value, thereby slowing down adaptation; even under such circumstances, divergence can begin to occur. A digital echo canceller is also known (EP-A-0 301 627) using a programmable filter operating in the time domain and an adaptive filter operating in the frequency domain, with a cascade configuration which lengthens transmission delay.

A broad band echo canceller is also known from an article by J. M. Paez Borrallo et al. published in Signal Processing 27, 1992, pp. 301–315, Elsevier Science Publishers, making use of impulse response partitioning in the time domain prior to applying filtering in the frequency domain.

SUMMARY OF THE INVENTION

It is an object of the invention to provide frequency echo canceller that is improved from the point of view of speed of adaptation, while nevertheless presenting little transmission delay and improving echo cancelling performance.

To this end, the invention uses a spectral subtraction technique, the use of which has already been envisaged in other domains such as speech recognition, taking advantage of the fact that passage into the frequency domain is already available in echo cancellers of the above-defined kind.

Consequently, the invention proposes an acoustical echo canceller suitable for being placed between a hands-free acoustical interface and a communications network, and comprising:

an adaptive filter receiving the coefficients of a direct discrete transform in the frequency domain, computed on successive blocks of an input signal, and applied via an inverse transform circuit to the subtractive input of an adder for forming an output signal going towards the network; and an adaptor circuit for adapting the filter coefficients;

the echo canceller being characterized in that said adaptor circuit receives the coefficients of the successive transforms of blocks of output signal samples via a noise reducer. This noise reducer is advantageously a spectral subtracter whose subtractive input receives the coefficients representative of the estimated noise spectral.

It is possible to use various models of noise, depending on the environment. The model may be estimated a priori, or more generally it may be determined during periods of silence (pauses in the speech of both near and far speakers). The structure of the noise spectral subtraction means and the algorithms implemented may be those described in the article by Lockwood and Boudy J. "Experiments with a non-linear spectral subtracter (NSS). Hidden Markov models and the projection, for robust speech recognition in cars", Speech Communication, Vol. 11, Nos. 2–3, pp. 215–228, June 1992, or in document EP-A-0 534 837.

The algorithm for adapting the weights of the filter coefficients operates in the frequency domain and can then be:

$$\dot{H}(k+1)=\dot{H}(k)+2F.g.F^{-1}.m(k).x^H(k).SPS[\dot{E}(k)]$$

where:

k is the order of the current block;

F designates the matrix of the discrete Fourier transform;

g is the gradient constraint matrix;

m is the diagonal matrix of input power normalized incrementation steps;

$\dot{H}$ is the vector of coefficients for the adaptive filter; SPS designates the spectral subtraction operator;

$x^H$ is the vector of input samples x(n); and $\dot{E}$ is the vector of output samples e(n) in the absence of double speech.

Whatever adaptation algorithm is used, spectral subtraction does not add significant complication since the direct and inverse transforms are necessary in any case.

Whether in the frequency domain or in the time domain, the process of adapting an adaptive filter is disturbed by the simultaneous presence of voice activity at both the near-end and far-end terminals (situation referred to as double speech or double talk).

To avoid such disturbances, it is usual to interrupt or slow down the process of adapting filter coefficients in the event of double speech. However, most existing double-speech detectors have slow response, and are usually incapable of distinguishing the presence of double speech from a change in the echo channel that increases echo level, and/or they do not operate in a very noisy environment, because they are based on observing energy.

Consequently, the invention provides a double-speech detector usable in an echo canceller of the above kind, making use of a reliable criterion for identifying the presence of near end speaker speech. This detector performs a measurement of spectral distortion by comparing spectral parameters extracted from the output signal of the interface (due to the far speaker) with the corresponding spectral parameters extracted from the input signal (due to noise, to the echo, and to the near speaker in the event of double speech). A sudden increase in the mismatch between the signals indicates the presence of high energy interference, due to near speech or to noise. Consequently, an echo canceller is proposed comprising means for extracting spectral parameters and means for evaluating distortion by comparing said parameters, and for causing adaptation to stop in the event of high distortion.

Distortion can be evaluated by using various different criteria.

A first possible criterion is measuring distance in the Itakura-Saito sense between two self-regressive models (constituting parameter extraction) computed on the input and output signals.

Another approach consists in using cepstral distances, using cepstral parameters as already used for speech recognition, as described, for example, in the article by Alexandre et al. "Root cepstral analysis: a unified view—application to speech processing in car noise environments" in Speech Communication 12, pp. 277–288, 1993.

The invention will be better understood on reading the following description of a particular embodiment given by way of non-limiting example. The description refers to the accompanying drawings.

BRIEF DESCRIPTION OF THE DRAWINGS

FIG. 2 is similar to a portion of FIG. 1 and is a block diagram showing one way in which the echo canceller of FIG. 1 can be modified in application of an aspect of the invention.

DESCRIPTION OF PREFERRED EMBODIMENTS

Figure 1:
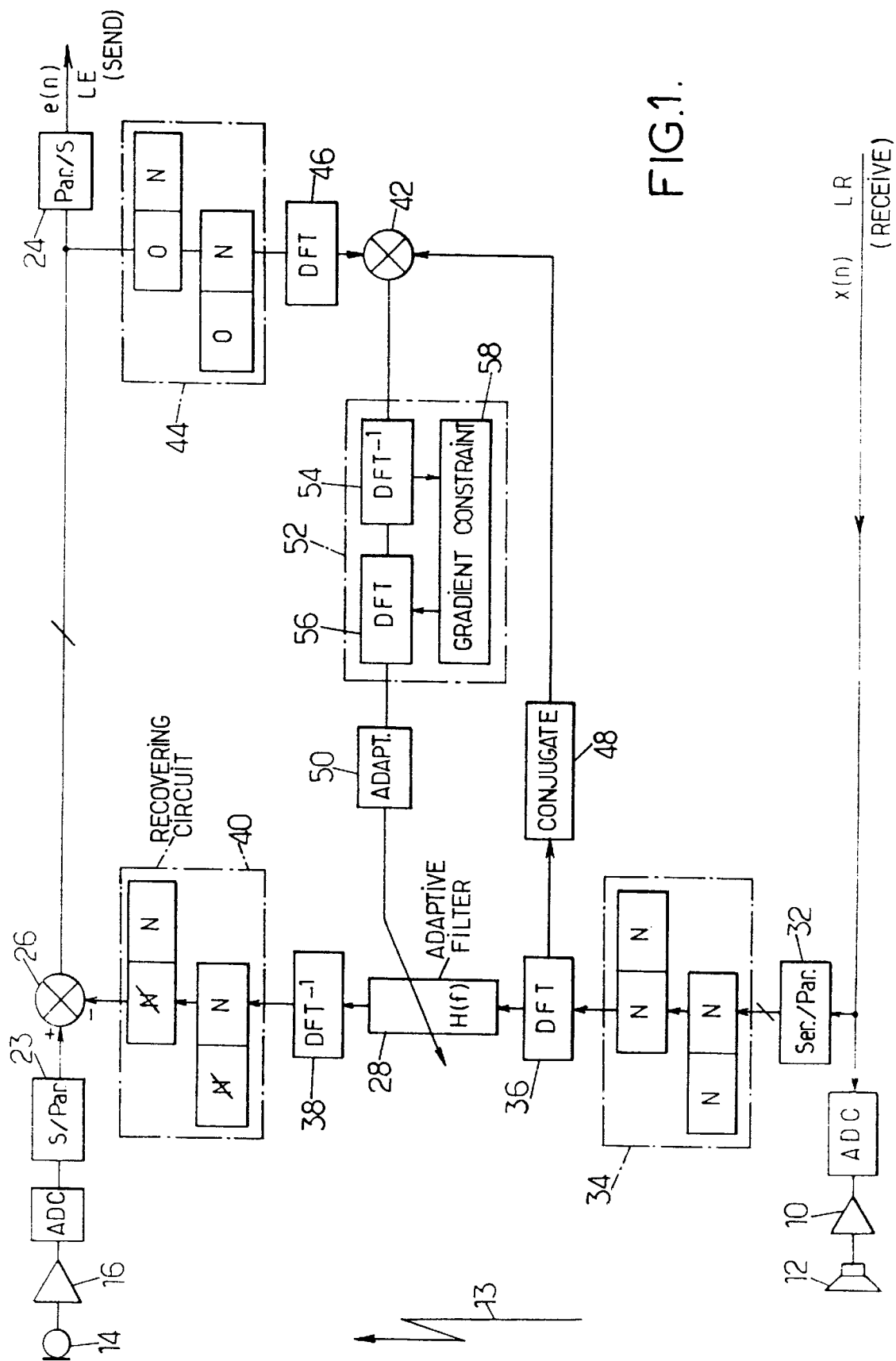
FIG. 1, already mentioned above, shows the basic structure of an echo canceller in the frequency domain.

In FIG. 2, elements corresponding to those of FIG. 1 are given the same reference numerals. It is assumed below that the canceller is intended for a hands-free telephone installation, that is to operate in a band extending from 300 Hz to 3.4 kHz, with sampling at 8 kHz. However, the same structure could be used in a hands-free terminal designed to operate in broad band at 16 kHz. By way of example, the blocks may be 256-sample blocks, corresponding to a duration of 32 ms at the common sampling frequency of 8 kHz.

The echo canceller of FIG. 2 does not include means for imposing a constraint on the gradient. On the other hand it does include a spectral subtracter 60 which receives both the direct transform coefficients as computed on one block and the corresponding coefficients representative of noise, coming from an estimator 62. The estimator may be updated during periods of no voice activity, by means not shown, such as those described in the above-mentioned documents. The subtracter 60 thus provides the circuit 50 for adapting the filter coefficients with a direct transform coefficient matrix corrected for the effect of noise.

The absence of voice activity can be determined by known means, e.g. based on measuring energy in a determined range of frequencies, both on the signal reaching the loudspeaker 12 and on the signal output by the microphone.

However, the estimator 62 may also be inhibited either by measuring the energy of the signal applied to the loudspeaker or by detecting a double-speech situation. This situation may be detected in particular by a block 64 for measuring spectral distortion. This block comprises two spectral parameter extractors 66 and 68, one receiving the signal z(n) output by the analog-to-digital converter 22 and the other receiving the incoming signal x(n). Finally, the block includes a circuit 69 for measuring similarity between the representative parameters of the signals x(n) and z(n). These parameters may, in particular, be those mentioned above. When a difference representative of a high level of distortion is detected, the circuit 68 applies a signal to the input 70 of the circuit 50 for stopping or slowing adaptation of the diagonal matrix m which includes the adaptation steps of the filter.

The echo canceller can easily be designed to provide a de-noised speech signal merely by implementing an additional inverse transform 72 and a parallel-to-series converter circuit 74.

We claim:

1. An acoustical echo canceller for use between a hands-free near end acoustical interface and a communication network, having a receive line and a send line, said echo canceller comprising:

means for computing coefficients of a direct discrete transform in the frequency domain of successive blocks of an input signal received on said receive line;

an adaptive filter connected to receive said coefficients of the direct discrete transform and arranged for delivering a filtered output;

means for computing an inverse transform of said filtered output;

adder means connected to receive successive blocks of a near end speech signal on an additive input, to receive said inverse transform circuit on a subtractive input thereof, and to deliver an outgoing signal on said send line;

an adapter circuit for adapting coefficients of said adaptive filter, responsive to coefficients of direct discrete transform of successive blocks of said outgoing signal; and means for subtracting coefficients representative of an acoustical noise spectrum from said coefficients of said direct discrete transform of blocks of said outgoing signal prior to application to said adapter circuit.

2. An echo canceller according to claim 1, further comprising means for stopping or slowing adaptation in the event of high energy interference due to noise or to a state of double speech.

3. An echo canceller according to claim 2, wherein said means for stopping or slowing adaptation includes means for extracting spectral parameters of the near end signal and spectral parameters of the input signal and comparator means for evaluating distortion by comparing said spectral parameters of the input signal and of the near end speech signal, whereby double speech can be detected.

4. An echo canceller according to claim 3, wherein said comparator means implement a measurement of distance in the Itakura-Saito sense between two self-regressive models, constituting extraction of parameters computed on the input and near end signals.

5. An echo canceller according to claim 3, wherein the said comparator means use cepstral parameters of the input and near end signals.

6. An acoustical echo canceller for use between a hands-free near end acoustical interface and a communication network, having a receive line and a send line, said echo canceller comprising:

means for computing coefficients of a direct discrete transform in the frequency domain of successive blocks of an input signal received on said receive line;

an adaptive filter connected to receive said coefficients of the direct discrete transform and arranged for delivering a filtered output;

means for computing an inverse transform of said filtered output;

adder means connected to receive successive blocks of a near end speech signal on an additive input, to receive said inverse transform circuit on a subtractive input thereof, and to deliver an outgoing signal on said send line;

an adapter circuit for adapting coefficients of said adaptive filter, responsive to coefficients of direct discrete transform of successive blocks of said outgoing signal; and means for subtracting coefficients representative of an acoustical noise spectrum from said coefficients of said direct discrete transform of blocks of said outgoing signal prior to application to said adapter circuit, said adapter circuit being arranged for adapting the coefficients by implementing the algorithm:

$$\dot{H}(k+1)=\dot{H}(k)+2F.g.F.^{-1}.m(k).\dot{X}^{H}(k).SPS[\dot{E}(k)]$$

where:

k is the order of a current block;

F designates a matrix of the discrete Fourier transform (DFT);

g is the gradient constraint matrix;

m is a diagonal matrix of input power normalized incrementation steps;

$\dot{H}$ is a vector of the coefficients for the adaptive filter (28);

SPS designates the spectral substraction operator;

$\dot{X}^H$ is a vector of input samples x (n); and $\dot{E}$ is a vector of output samples e (n) in the absence of double talk.

7. An acoustical echo canceller for use between a hands-free near end acoustical interface and a communication network, having a receive line and a send line, said echo canceller comprising:

means for computing coefficients of a direct discrete transform in the frequency domain of successive blocks of an input signal received on said receive line;

an adaptive filter connected to receive said coefficients of the direct discrete transform and arranged for delivering a filtered output;

means for computing an inverse transform of said filtered output;

adder means connected to receive successive blocks of a near end speech signal on an additive input, to receive said inverse transform circuit on a subtractive input thereof, and to deliver an outgoing signal on said send line;

an adapter circuit for adapting coefficients of said adaptive filter, responsive to coefficients of direct discrete transform of successive blocks of said outgoing signal; and means for subtracting coefficients representative of an acoustical noise spectrum from said coefficients of said direct discrete transform of blocks of said outgoing signal prior to application to said adapter circuit; and circuit means for supplying a local de-noised speech signal of a near end speaker, said circuit means being arranged to perform an inverse transform of the output of said subtracting means from the frequency domain and a parallel-to-series conversion.

\* \* \* \* \*